US008446405B2

(12) United States Patent
Chen et al.

(10) Patent No.: US 8,446,405 B2
(45) Date of Patent: May 21, 2013

(54) METHOD AND APPARATUS FOR DC LEVEL REDISTRIBUTION

(75) Inventors: Szu-Ping Chen, Hsinchu County (TW); Jui-Yuan Tsai, Tai-Nan (TW); Cheng-Jui Chen, Tao-Yuan Hsien (TW)

(73) Assignee: Realtek Semiconductor Corp., Hsinchu (TW)

( * ) Notice: Subject to any disclaimer, the term of this patent is extended or adjusted under 35 U.S.C. 154(b) by 740 days.

(21) Appl. No.: 12/562,113

(22) Filed: Sep. 17, 2009

(65) Prior Publication Data

US 2010/0066725 A1  Mar. 18, 2010

(30) Foreign Application Priority Data

Sep. 18, 2008  (TW) .............................. 97135762 A

(51) Int. Cl.
*G06F 3/038*  (2006.01)

(52) U.S. Cl.
USPC ............................. 345/213; 345/204; 345/205

(58) Field of Classification Search
USPC ........ 345/64, 213, 204, 205, 87, 94; 327/252, 327/307; 341/155
See application file for complete search history.

(56) References Cited

U.S. PATENT DOCUMENTS

| 6,388,521 | B1  |   | 5/2002  | Henry           |         |
|-----------|-----|---|---------|-----------------|---------|
| 6,973,182 | B1  | * | 12/2005 | Aude            | 379/399.01 |
| 7,916,062 | B2  | * | 3/2011  | Tsai et al.     | 341/155 |
| 2005/0259092 | A1 | * | 11/2005 | Aoki         | 345/204 |
| 2007/0146279 | A1 | * | 6/2007  | Oke et al.   | 345/94  |
| 2008/0084338 | A1 |   | 4/2008  | Tsai         |         |
| 2008/0157846 | A1 | * | 7/2008  | Liu et al.   | 327/307 |
| 2008/0180372 | A1 | * | 7/2008  | Kim et al.   | 345/87  |
| 2009/0058776 | A1 | * | 3/2009  | Tomohiro et al. | 345/87 |
| 2009/0128527 | A1 | * | 5/2009  | Itakura et al. | 345/205 |
| 2010/0001776 | A1 | * | 1/2010  | Nakamura et al. | 327/252 |

\* cited by examiner

*Primary Examiner* — Thuy Pardo

(74) *Attorney, Agent, or Firm* — McClure, Qualey & Rodack, LLP

(57) ABSTRACT

A DC level redistribution method includes the steps of: receiving all positive signals and one negative signal of a plurality of pairs of differential signals; fixing a DC level of a positive signal of a designated pair of differential signals among a plurality of pairs of differential signals as a reference in order to adjust a DC level of a negative signal of the designated pair of differential signals for generating an adjusted negative signal; and taking the adjusted negative signal of the designated pair of differential signals as a reference in order to adjust DC levels of the positive signals of the other pairs of differential signals excluding the designated pair of differential signals. The DC redistribution method may be used in a display system.

12 Claims, 5 Drawing Sheets

METHOD AND APPARATUS FOR DC LEVEL REDISTRIBUTION

BACKGROUND OF THE INVENTION

1. Field of the Invention

The present invention relates to a mechanism for DC level redistribution, and more particularly, to a method and an apparatus of DC level redistribution for saving pins by mixing two kinds of DC level redistributions.

2. Description of the Prior Art

Display system chips, such as televisions and liquid crystal display (LCD) screens, usually have an analog front-end circuit for converting analog signals (such as R, G, and B) into digital signals for displaying images. In practice, the analog signals are usually single-ended signals. But for noise considerations, the display system chip will adopt differential signals in signal processing, and thus the received single-ended signals must be converted into differential signals within the chip. Because the DC level of each signal is different from each other, AC-coupling techniques are used to input AC components of the signals into the display system chip. And then the DC level of each signal is redistributed after AC coupling capacitors.

Common approaches of the DC level redistribution, taking the DC level redistribution of image signals as an example, can be divided into two categories: a first approach is to first fix the DC levels of negative signals (e.g. R−, G−, and B−) of differential signals, and then fine-tune the DC levels of positive signals (e.g. R+, G+, and B+) of the differential signals; and a second approach is to first fix the DC levels of the positive signals of the differential signals, and then fine-tune the DC levels of the negative signals of the differential signals. The first approach has the advantage of sharing negative pins, but its disadvantage is that the voltage levels of the positive signals cannot be fixed at their assigned absolute voltages. However, the second approach allows the voltage levels of the positive signals to be fixed at their assigned absolute voltages, but separate negative pins are required, which is not allowed for a highly integrated display chip.

SUMMARY OF THE INVENTION

It is therefore one of the objectives of the present invention to provide a method and a related apparatus for DC level redistribution to solve the abovementioned problems.

According to an exemplary embodiment of the present invention, a method for DC level redistribution is provided. The method includes the steps of: receiving all positive signals and one negative signal of a plurality of pairs of differential signals; fixing a DC level of the positive signal of a designated pair of differential signals among the plurality of pairs of differential signals as a reference in order to adjust a DC level of the negative signal of the designated pair of differential signals for generating an adjusted negative signal; and taking the adjusted negative signal of the designated pair of differential signals as a reference in order to adjust DC levels of the positive signals of the other pairs of differential signals excluding the designated pair of differential signals. The designated pair of differential signals may have a Sync signal, and the designated pair of differential signals may be a SOG signal or a SOY signal.

According to another exemplary embodiment of the present invention, a DC level redistributing apparatus is provided. The DC level redistributing apparatus includes a plurality of positive pins, a negative pin, a first positive clamping circuit, a first negative adjusting circuit, and a plurality of second positive adjusting circuit. The plurality of positive pins is respectively used for receiving a positive signal among a plurality of pairs of differential signals. The negative pin receives a negative signal of a designated pair of differential signals among the plurality of pairs of differential signals. The first positive clamping circuit is coupled to a corresponding pin of the positive signal of the designated pair of differential signals for fixing the DC level of the positive signal of the designated pair of differential signals. The first negative adjusting circuit is coupled to a corresponding pin of the negative signal of the designated pair of differential signals for taking the DC level of the positive signal of the designated pair of differential signals as a reference to adjust the DC level of the negative signal of the designated pair of differential signals, so as to generate an adjusted negative signal. The plurality of second positive adjusting circuits are respectively coupled to corresponding pins of the positive signals of the other pairs of differential signals excluding the designated pair of differential signals for taking the adjusted negative signal of the designated pair of differential signals as a reference to adjust DC levels of the positive signals of the other pairs of differential signals excluding the designated pair of differential signals. The DC level redistributing apparatus may be applied to an analog front-end processing device of a display system.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
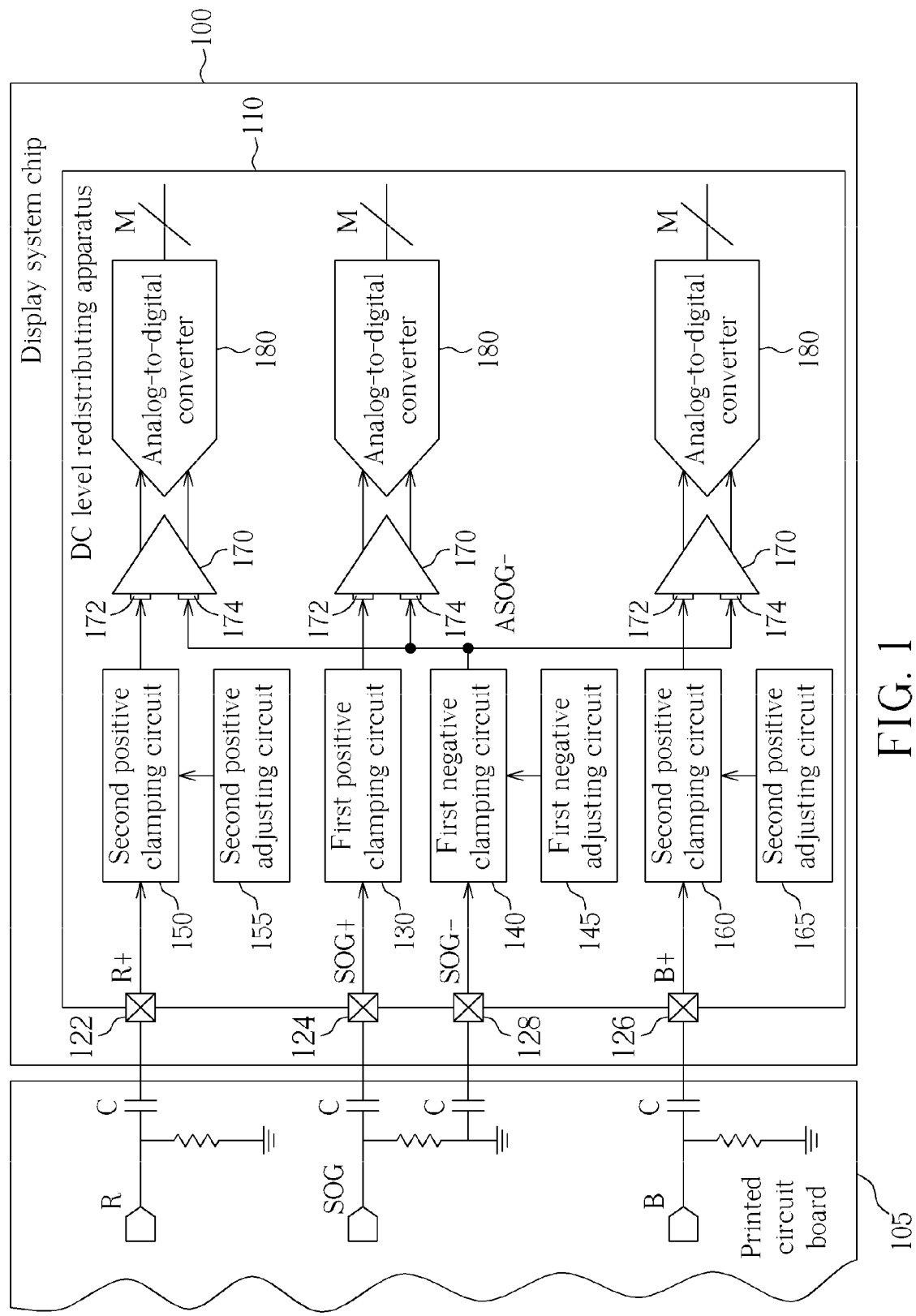
FIG. 1 is a diagram showing a DC level redistributing apparatus applied to a display system according to an embodiment of the present invention.

Please refer to FIG. 1. FIG. 1 is a diagram showing a DC level redistributing apparatus 110 applied to a display system according to an embodiment of the present invention. The DC level redistributing apparatus 110 can be applied to a variety of differential signals, herein it is merely a practicable embodiment of being applied to image differential signals of a display system. The DC level redistributing apparatus 110 is disposed inside a display system chip 100. The display system chip 100 receives a plurality of pairs of image differential signals R, SOG, and B, and then utilizes AC coupling capacitors C to input AC components of the image differential signals into the display system chip 100 from a printed circuit board (PCB) 105. Each pair of image differential signals respectively consists of a positive signal (i.e., R+, SOG+, and B+) and a negative signal (i.e., R−, SOG−, and B−), wherein the positive signal SOG+ of a designated pair of image differential signals SOG has a Sync signal. The DC level redistributing apparatus 110 equipped with a plurality of positive pins 122, 124, and 126 respectively used for receiving the positive signals R+, SOG+, and B+ among the plurality of pairs of image differential signals and a negative pin 128 for receiving the negative signal SOG− of the designated pair of image differential signals.

The DC level redistributing apparatus 110 includes, but is not limited to, a first positive clamping circuit 130, a first negative clamping circuit 140, a first negative adjusting circuit 145, a plurality of second positive clamping circuits 150 and 160, a plurality of second positive adjusting circuits 155 and 165, a plurality of input buffers 170, and a plurality of analog-to-digital converters 180. The first positive clamping circuit 130 is coupled to a corresponding pin 124 of the positive signal SOG+ of the designated pair of image differential signals for fixing the DC level of the positive signal SOG+. The first negative adjusting circuit 145 takes the DC level of the positive signal SOG+ as a reference in order to adjust the DC level of the negative signal SOG−, so as to generate an adjusted negative signal ASOG−. The first negative clamping circuit 140 is coupled to the corresponding pin 128 of the negative signal SOG− of the designated pair of differential signals and the first negative adjusting circuit 145 for fixing the DC level of the adjusted negative signal ASOG−. The second positive adjusting circuits 155 and 156 respectively take the adjusted negative signal ASOG− of the designated pair of differential signals as a reference in order to adjust DC levels of the positive signals R+ and B+ of the other pairs of differential signals excluding the designated pair of differential signals. The second positive clamping circuits 150 and 160 are respectively coupled to the corresponding pins 122 and 126 of the positive signals R+ and B+ of the other pairs of differential signals excluding the designated pair of differential signals and the second positive adjusting circuits 155 and 165, for fixing the DC levels of the positive signals R+ and B+ of the other pairs of differential signals excluding the designated pair of differential signals. The positive signals R+, SOG+, and B+ of each pair of image differential signals are inputted to the positive input ends 172 of their corresponding input buffer 170, and the adjusted negative signal ASOG− is inputted to the negative input ends 174 of each input buffer 170. Finally, the plurality of image differential signals R, SOG, and B are converted into digital format by their corresponding digital-to-analog converters 180.

As can be known from FIG. 1, the three pairs of image differential signals of the DC level redistributing apparatus 110 can share the same negative pin 128. In this embodiment, the image differential signals R, SOG, and B are cited as an example. Those skilled in the art should know that this should not be limitations of the present invention, and the present invention can be applied to image signals of other formats, such as: Y, Pb, and Pr. In addition, the number of image differential signals is no limited. As an illustration, if totally N pairs of image differential signals are included, only (N+1) pins (including N positive pins and one negative pin) are required in the DC level redistributing apparatus disclosed in the present invention.

Please note that the abovementioned embodiment is merely an example for describing the present invention, and in no way should be considered to be limitations of the scope of the present invention. In other embodiments, the image differential signals R or B can be adopted as the designated pair of image differential signals. It will be obvious to those skilled in the art that various modifications of the designated pair of image differential signals may be made without departing from the spirit of the present invention.

Please also note that, the DC level of the positive signal SOG+ of the designated pair of image differential signals can be fixed at its assigned absolute voltage by adopting the first positive clamping circuit 130, and then the adjusted negative signal ASOG− can be generated by taking the DC level of the positive signal SOG+ as the reference in order to adjust the DC level of the negative signal SOG−. Since the DC levels of the positive signals R+ and B+ are adjusted based on the reference of the adjusted negative signal ASOG−, the DC levels of the positive signals R+ and B+ can be fixed at their assigned absolute voltages as well. As can be seen, the DC level redistribution mechanism disclosed in the present invention is possessed of both the advantages of the two approaches of the DC level redistribution mentioned in the prior art.

In one embodiment, the display system chip 100 can be a television or an LCD monitor. But this should not be a limitation of the present invention, and can be display system chips of other types. The DC level redistributing apparatus 110 can be an analog front-end processing device, but the present invention is not limited to this only.

Figure 2:
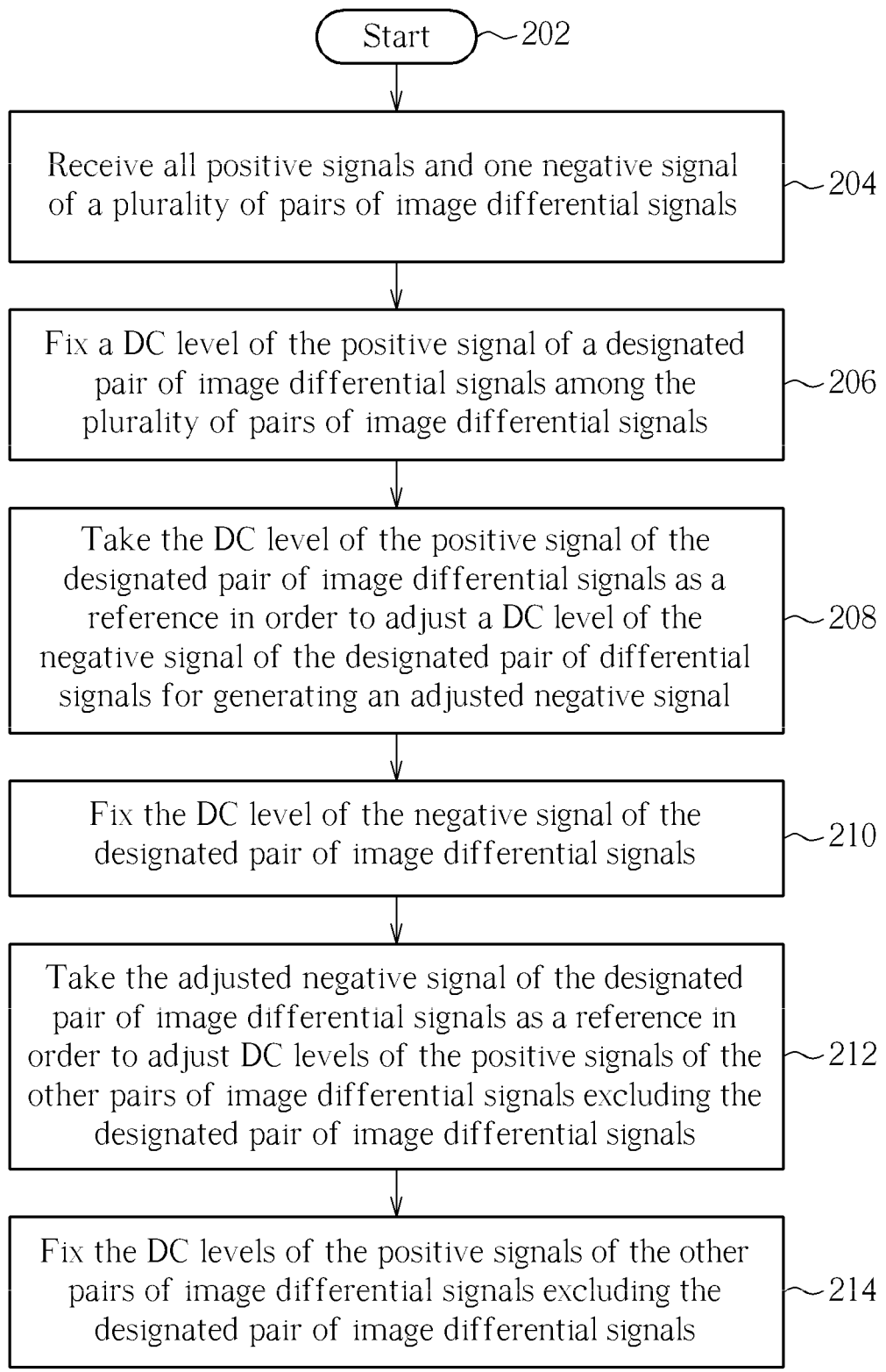
FIG. 2 is a flowchart illustrating a method for DC level redistribution according to an exemplary embodiment of the present invention.

Please refer to FIG. 2. FIG. 2 is a flowchart illustrating a method for DC level redistribution according to an exemplary embodiment of the present invention. The method includes, but is not limited to, the following steps:

Step 202: Start.

Step 204: Receive all positive signals and one negative signal of a plurality of pairs of image differential signals.

Step 206: Fix a DC level of the positive signal of a designated pair of image differential signals among the plurality of pairs of image differential signals.

Step 208: Take the DC level of the positive signal of the designated pair of image differential signals as a reference in order to adjust a DC level of the negative signal of the designated pair of differential signals for generating an adjusted negative signal.

Step 210: Fix the DC level of the negative signal of the designated pair of image differential signals.

Step 212: Take the adjusted negative signal of the designated pair of image differential signals as a reference in order to adjust DC levels of the positive signals of the other pairs of image differential signals excluding the designated pair of image differential signals.

Step 214: Fix the DC levels of the positive signals of the other pairs of image differential signals excluding the designated pair of image differential signals.

Please note that the steps of the abovementioned flowchart are merely an exemplary embodiment of the present invention, and in no way should be considered to be limitations of the scope of the present invention. The method can include other intermediate steps or can merge several steps into a single step without departing from the spirit of the present invention.

Figure 3:
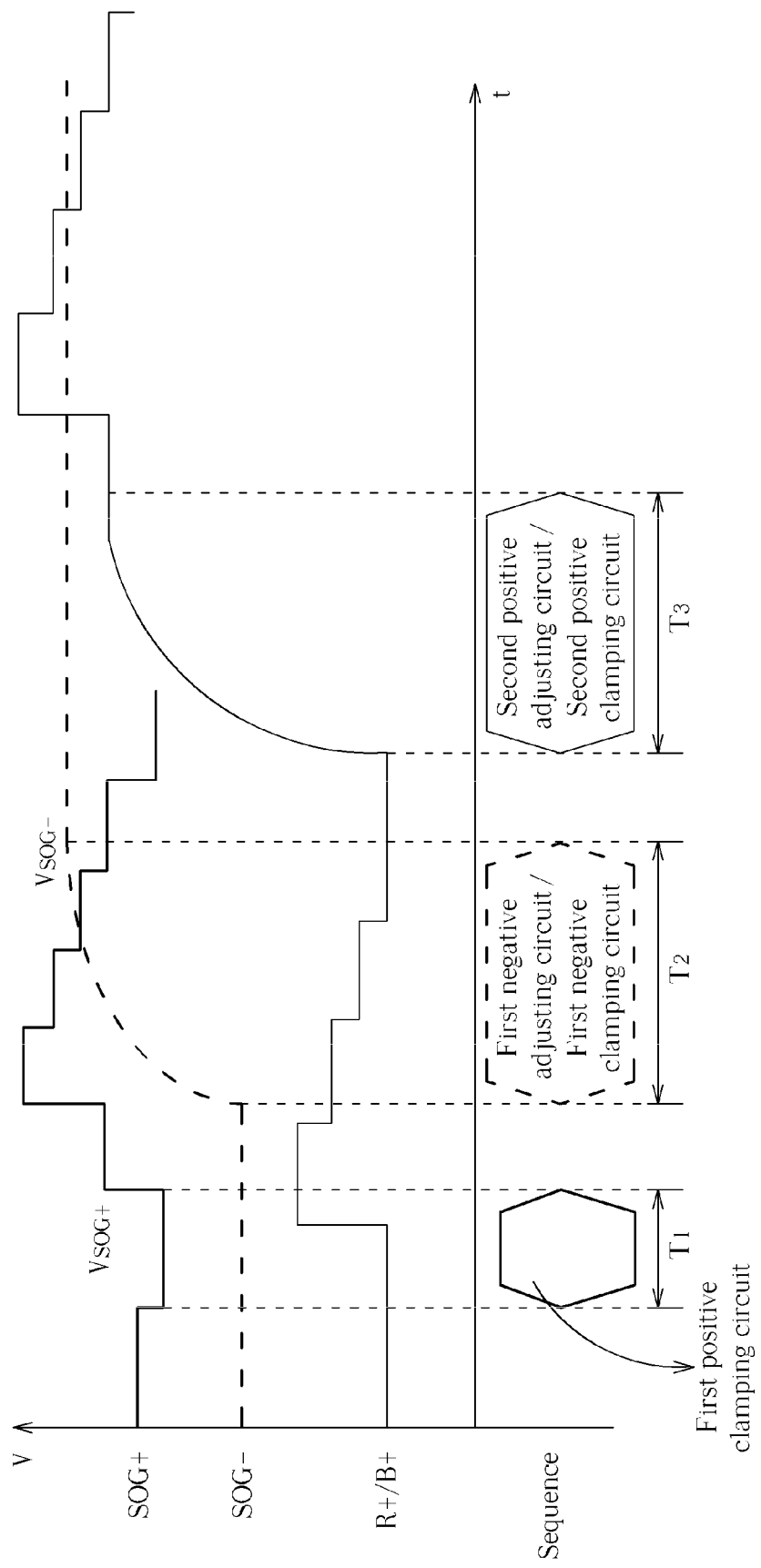
FIG. 3 is a diagram illustrating the details how to redistribute DC levels according to a first embodiment of the present invention.

Please refer to FIG. 3. FIG. 3 is a diagram illustrating the details how to redistribute DC levels according to a first embodiment of the present invention. The following description details how to redistribute DC levels by collocating the steps shown in FIG. 2, the elements shown in FIG. 1, and the diagram shown in FIG. 3. In Step 204, the plurality of positive signals R+, SOG+, and G+ are respectively received by the plurality of positive pins 122, 124, and 126, and the negative signal SOG− of the designated pair of image differential signals is received by the negative pin 128. At first, the DC level of the positive signal SOG+ is fixed at $V_{SOG+}$ by the first positive clamping circuit 130, which is also referred to Step 206 in FIG. 2 and the time slot $T_1$ in FIG. 3. After that, the first negative adjusting circuit 145 takes the DC level $V_{SOG+}$ of the positive signal SOG+ as the reference in order to adjust the DC level of the negative signal SOG− for generating the adjusted negative signal ASOG−, and the DC level of the adjusted negative signal ASOG− is fixed at $V_{SOG-}$ by the first negative clamping circuit 140, which can be referred to the steps 208 and 210 in FIG. 2 and the time slot $T_2$ in FIG. 3. Finally, the second positive adjusting circuits 155 and 165 take the DC level $V_{SOG-}$ of the adjusted negative signal ASOG− as the reference in order to adjust the DC levels of the positive signals R+ and B+, and the DC levels of the positive signals R+ and B+ are fixed by the second positive clamping circuits 150 and 160, which can be referred to the steps 212 and 214 in FIG. 2 and the time slot $T_3$ in FIG. 3.

Figure 4:
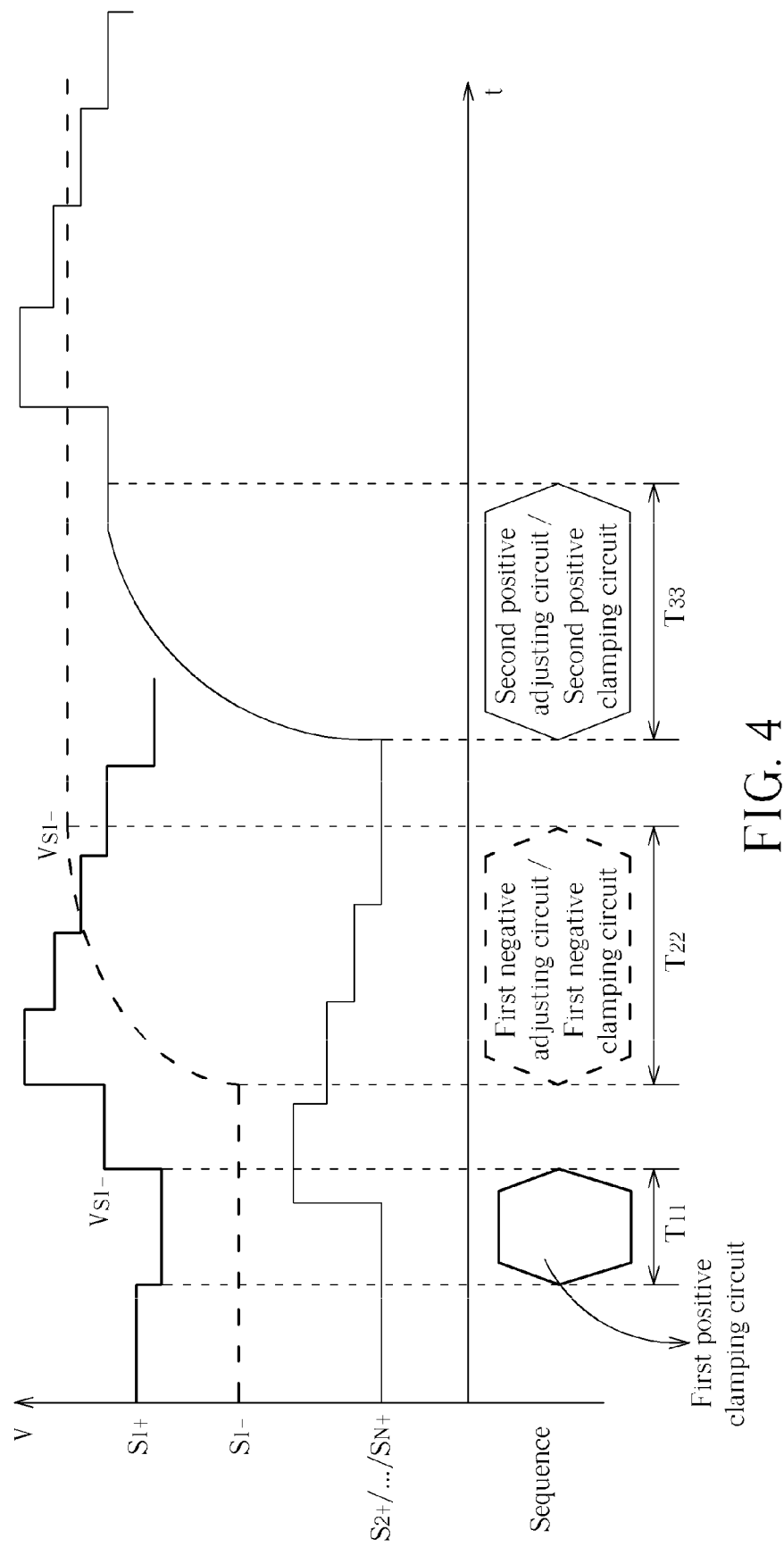
FIG. 4 is a diagram illustrating the details how to redistribute DC levels according to a second embodiment of the present invention.

Please refer to FIG. 4. FIG. 4 is a diagram illustrating the details how to redistribute DC levels according to a second embodiment of the present invention. The second embodiment shown in FIG. 4 is similar to the first embodiment shown in FIG. 3, and the difference between them is that the format of the plurality of pairs of image differential signals is not limited to R, SOG, B (or R, G, B) only, and the number of the signals is not restricted to three. As shown in FIG. 4, assume that the image differential signal $S_1$ represents the designated pair of image differential signals. Hence, a plurality of positive pins are respectively used for receiving the positive signals $S_{1+} \sim S_{N+}$ of a plurality of pairs of image differential signals $S_1 \sim S_N$, and a negative pin is used for receiving the negative signal $S_{1-}$ of the designated pair of image differential signals. At first, the DC level of the positive signal $S_{1+}$ is fixed at $V_{S1+}$ by the first positive clamping circuit, which is also referred to Step 206 in FIG. 2 and the time slot $T_{11}$ in FIG. 4. After that, the first negative adjusting circuit takes the DC level $V_{S1+}$ of the positive signal $S_{1+}$ as the reference in order to adjust the DC level of the negative signal $S_{1-}$, and the DC level of the adjusted negative signal $S_{1-}$ is fixed at $V_{S1-}$ by the first negative clamping circuit, which can be referred to the steps 208 and 210 in FIG. 2 and the time slot $T_{22}$ in FIG. 4. Finally, the second positive adjusting circuits take the DC level $V_{S1-}$ of the adjusted negative signal $S_{1-}$ as the reference in order to adjust the DC levels of the positive signals $S_{2+} \sim S_{N+}$, and the DC levels of the positive signals $S_{2+} \sim S_{N+}$ are fixed by the second positive clamping circuits, which can be referred to the steps 212 and 214 in FIG. 2 and the time slot $T_{33}$ in FIG. 4.

Figure 5:
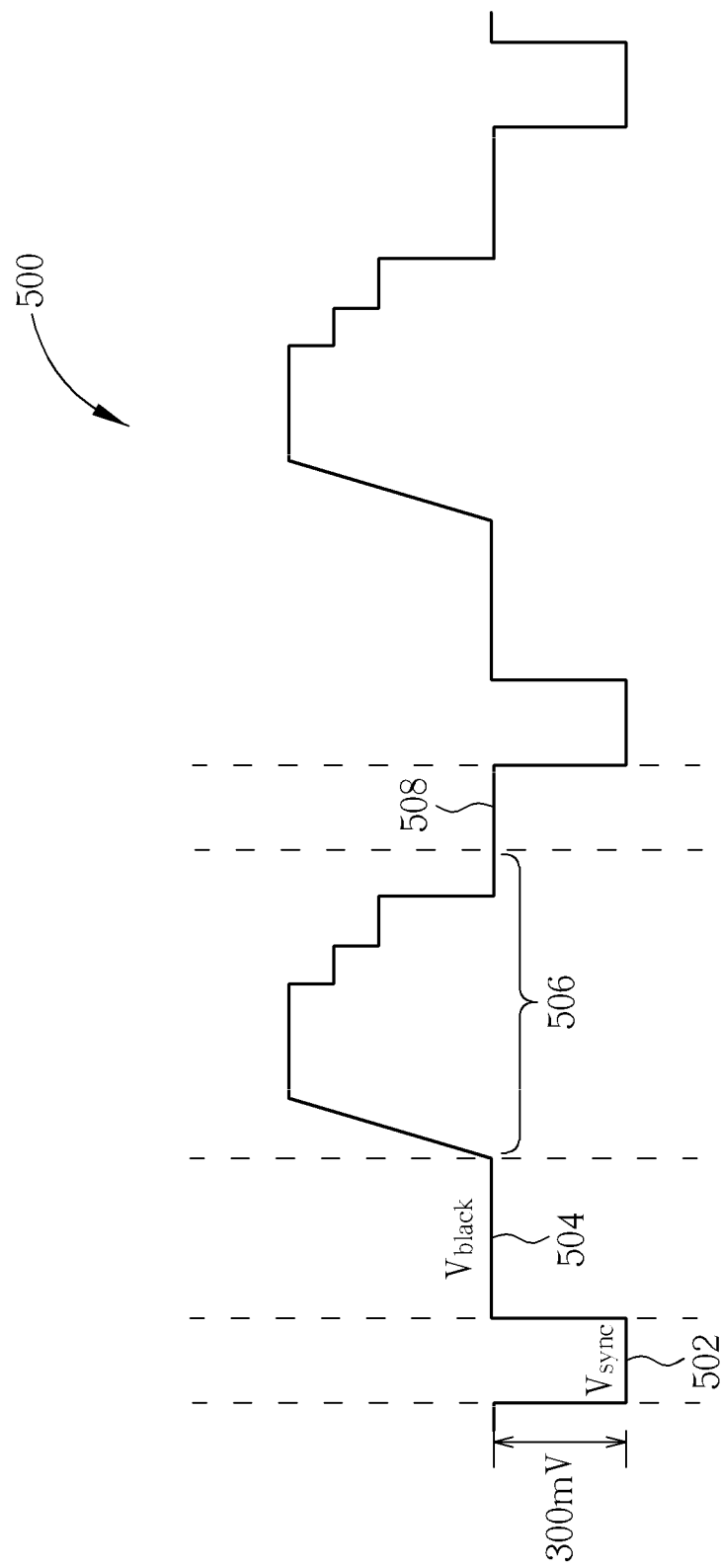
FIG. 5 is a diagram showing a positive signal of a pair of image differential signals received by the DC level redistributing apparatus according to an embodiment of the present invention.

Please refer to FIG. 5. FIG. 5 is a diagram showing a positive signal 500 of a pair of image differential signals received by the DC level redistributing apparatus according to an embodiment of the present invention. As shown in FIG. 5, the positive signal 500 of the pair of image differential signals can be divided into several blocks 502, 504, 506, and 508, wherein the block 502 carries a Sync signal, the block 506 carries image signals, and the blocks 504 and 508 provide the black level of the image signals. When the image signals of the block 506 are processed by the display system chip, a reference voltage level is required to read the contents of the image signals accurately. Hence, the blocks 504 and 508 can provide the required reference voltage level. Generally speaking, the voltage difference between the blocks 502 and 504 is substantially 300 mV, wherein the voltage level $V_{sync}$ of the block 502 is equal to 0.1V and the voltage level $V_{black}$ of the block 504 is equal to 0.4V. What calls for special attention is that the abovementioned voltage difference may be changed depending upon different formats of the signal sources. Therefore, the DC level of the positive signal (such as SOG+) of the designated pair of image differential signals can be fixed at $V_{sync}$ or $B_{black}$ in Step 206. In Step 208, the DC level of the negative signal (such as SOG−) of the designated pair of image differential signals can be adjusted according to the voltage level $V_{sync}$ among the Sync signal or the black level $V_{black}$ of the positive signal of the designated pair of image differential signals.

Please note that the abovementioned embodiments are presented merely for illustrating features of the present invention and should not be seen as limitations of the present invention. It will be obvious to those skilled in the art that various modifications of the method for adjusting the DC level of the negative signal among the designated pair of image differential signals may be made without departing from the spirit of the present invention. Moreover, if there is no Sync signal (such as R+ or B+) attached to the positive signal 500 of the pair of the image differential signals, the block 502 does not exist in the positive signal 500, which should also belong to the scope of the present invention.

The abovementioned embodiments are presented merely for describing the present invention, and in no way should be considered to be limitations of the scope of the present invention. In summary, the present invention provides a method for DC level redistribution and a related apparatus. Through mixed use of the aforementioned two approaches for DC level redistribution (i.e., the first approach —to first fix the DC levels of negative signals of differential signals, and then fine-tune the DC levels of positive signals of the differential signals; and the second approach —to first fix the DC levels of the positive signals of the differential signals, and then fine-tune the DC levels of the negative signals of the differential signals), the DC level redistribution mechanism disclosed in the present invention is possessed of both the advantages of these two approaches of the DC level redistribution mentioned in the prior art. If totally N pairs of image differential signals are included, only (N+1) pins (including N positive pins and one negative pin) are required in the DC level redistributing apparatus disclosed in the present invention and thereby the goal of saving the pin number and reducing cost can be achieved. In addition, the DC levels of all positive signals can be fixed at their assigned absolute voltages.

Those skilled in the art will readily observe that numerous modifications and alterations of the device and method may be made while retaining the teachings of the invention.

What is claimed is:

1. A method for DC level redistribution, comprising:
   receiving all positive signals of a plurality of pairs of differential signals by a plurality of positive pins and receiving one negative signal of a plurality of pairs of differential signals by a negative pin;
   fixing a DC level of the positive signal of a designated pair of differential signals among the plurality of pairs of differential signals at a voltage level of a Sync signal comprised in the positive signal by a first positive clamping circuit as a reference in order to adjust a DC level of the negative signal of the designated pair of differential signals for generating an adjusted negative signal according to the voltage level of the Sync signal; and
   taking the adjusted negative signal of the designated pair of differential signals as a reference in order to adjust DC levels of the positive signals of the other pairs of differential signals excluding the designated pair of differential signals by a plurality of second positive adjusting circuits.

2. The method of claim 1, wherein the designated pair of differential signals is a Sync On Green (SOG) signal.

3. The method of claim 1, wherein the designated pair of differential signals is a Sync On Y (SOY) signal.

4. The method of claim 1, being applied to an analog front-end processing device of a display system.

5. A DC level redistributing apparatus, comprising:

a plurality of positive pins, respectively used for receiving a positive signal among a plurality of pairs of differential signals; a negative pin, for receiving a negative signal of a designated pair of differential signals among the plurality of pairs of differential signals;

a first positive clamping circuit, coupled to a corresponding pin of the positive signal of the designated pair of differential signals, for fixing the DC level of the positive signal of the designated pair of differential signals;

a first negative adjusting circuit, coupled to a corresponding pin of the negative signal of the designated pair of differential signals, for taking the DC level of the positive signal of the designated pair of differential signals as a reference to adjust the DC level of the negative signal of the designated pair of differential signals, so as to generate an adjusted negative signal;

a plurality of second positive adjusting circuits, respectively coupled to corresponding pins of the positive signals of the other pairs of differential signals excluding the designated pair of differential signals, for taking the adjusted negative signal of the designated pair of differential signals as a reference in order to adjust DC levels of the positive signals of the other pairs of differential signals excluding the designated pair of differential signals;

a first negative clamping circuit, coupled to the corresponding pin of the negative signal of the designated pair of differential signals and the first negative adjusting circuit, for fixing the DC level of the negative signal of the designated pair of differential signals; and a plurality of second positive clamping circuits, respectively coupled to the corresponding pins of the positive signals of the other pairs of differential signals excluding the designated pair of differential signals and the plurality of second positive adjusting circuits, for fixing the DC levels of the positive signals of the other pairs of differential signals excluding the designated pair of differential signals.

6. The DC level redistributing apparatus of claim 5, wherein the positive signal of the designated pair of differential signals comprises a Sync signal.

7. The DC level redistributing apparatus of claim 6, wherein the designated pair of differential signals is a SOG signal.

8. The DC level redistributing apparatus of claim 6, wherein the designated pair of differential signals is a SOY signal.

9. The DC level redistributing apparatus of claim 6, wherein the first negative adjusting circuit adjusts the DC level of the negative signal of the designated pair of differential signals according to a voltage level of the Sync signal.

10. The DC level redistributing apparatus of claim 5, wherein the first negative adjusting circuit adjusts the DC level of the negative signal of the designated pair of differential signals according to a black level of the positive signal of the designated pair of differential signals.

11. The DC level redistributing apparatus of claim 5, being applied to an analog front-end processing device of a display system.

12. A method for DC level redistribution, comprising:

receiving all positive signals of a plurality of pairs of differential signals by a plurality of positive pins and receiving one negative signal of a plurality of pairs of differential signals by a negative pin;

fixing a DC level of the positive signal of a designated pair of differential signals among the plurality of pairs of differential signals at a black level comprised in the positive signal by a first positive clamping circuit as a reference in order to adjust a DC level of the negative signal of the designated pair of differential signals for generating an adjusted negative signal according to the black level; and taking the adjusted negative signal of the designated pair of differential signals as a reference in order to adjust DC levels of the positive signals of the other pairs of differential signals excluding the designated pair of differential signals by a plurality of second positive adjusting circuits.

* * * * *